US012645021B2

(12) United States Patent
Jarvenpaa

(10) Patent No.: US 12,645,021 B2
(45) Date of Patent: Jun. 2, 2026

(54) OPTICAL APPARATUS, MODULES AND DEVICES

(71) Applicant: Nokia Technologies Oy, Espoo (FI)

(72) Inventor: Toni Johan Jarvenpaa, Akaa (FI)

(73) Assignee: Nokia Technologies Oy, Espoo (FI)

( * ) Notice: Subject to any disclaimer, the term of this patent is extended or adjusted under 35 U.S.C. 154(b) by 286 days.

(21) Appl. No.: 18/038,772

(22) PCT Filed: Nov. 10, 2021

(86) PCT No.: PCT/EP2021/081190
§ 371 (c)(1),
(2) Date: May 25, 2023

(87) PCT Pub. No.: WO2022/111993
PCT Pub. Date: Jun. 2, 2022

(65) Prior Publication Data
US 2024/0103212 A1     Mar. 28, 2024

(30) Foreign Application Priority Data
Nov. 30, 2020     (EP) .................................... 20210586

(51) Int. Cl.
*G02B 27/01* (2006.01)
*F21V 8/00* (2006.01)

(52) U.S. Cl.
CPC ......... *G02B 6/0016* (2013.01); *G02B 6/0036* (2013.01); *G02B 6/0058* (2013.01); *G02B 6/0076* (2013.01); *G02B 27/0101* (2013.01); *G02B 2027/0118* (2013.01)

(58) Field of Classification Search
None
See application file for complete search history.

(56) References Cited

U.S. PATENT DOCUMENTS 8,233,204 B1 * 7/2012 Robbins ................. G02B 27/01
                                                        359/566
2009/0303212 A1 * 12/2009 Akutsu .............. G02B 27/0172
                                                        345/204
2018/0046859 A1   2/2018 Jarvenpaa
(Continued)

FOREIGN PATENT DOCUMENTS

CN         111308598 A      6/2020
CN         111240015 B * 12/2020 ......... G02B 27/0101
WO    WO-2008038058 A1 * 4/2008 ......... G02B 27/0081

*Primary Examiner* — Chris H Chu
(74) *Attorney, Agent, or Firm* — McCarter & English, LLP

(57) ABSTRACT

Examples of the disclosure relate to optical apparatus, modules, and devices. Examples of the disclosure relate to an apparatus including a light guide. The light guide includes at least an in-coupling diffractive member configured to in-couple one or more input beams of light into the light guide from a light engine, an expander configured to expand the one or more input beams of light, and an out-coupling diffractive member configured to out-couple the one or more expanded beams of light from the light guide. The out-coupling diffractive member includes at least a first section configured to out-couple the one or more expanded beams of light with a first efficiency and at least a second section configured to out-couple the one or more expanded beams of light with a second efficiency, where the second efficiency is lower than the first efficiency.

14 Claims, 9 Drawing Sheets

(56)         References Cited

U.S. PATENT DOCUMENTS

2018/0188528 A1      7/2018  Browy et al.
2019/0056593 A1*     2/2019  Bablumyan ............ G02B 27/44
2020/0103657 A1      4/2020  Kimmel et al.
2020/0166691 A1      5/2020  Vartiainen et al.
2020/0200954 A1      6/2020  Mossberg et al.
2022/0082936 A1*     3/2022  Franke ................. G03F 7/0005

* cited by examiner

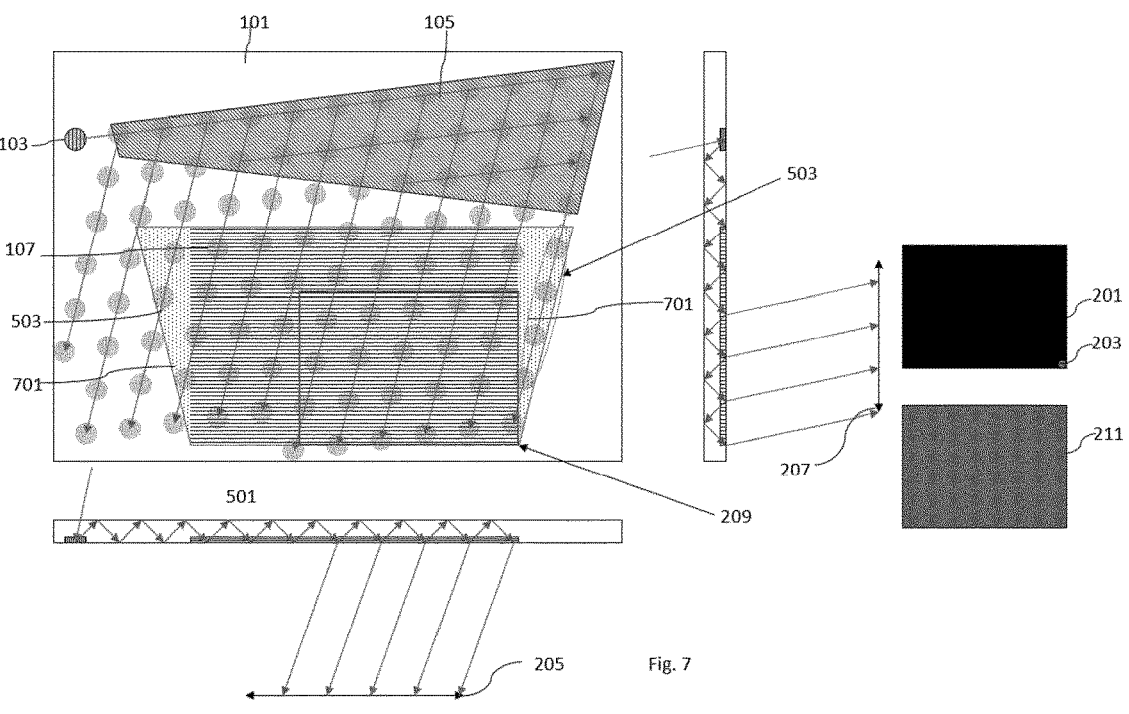
Fig. 7
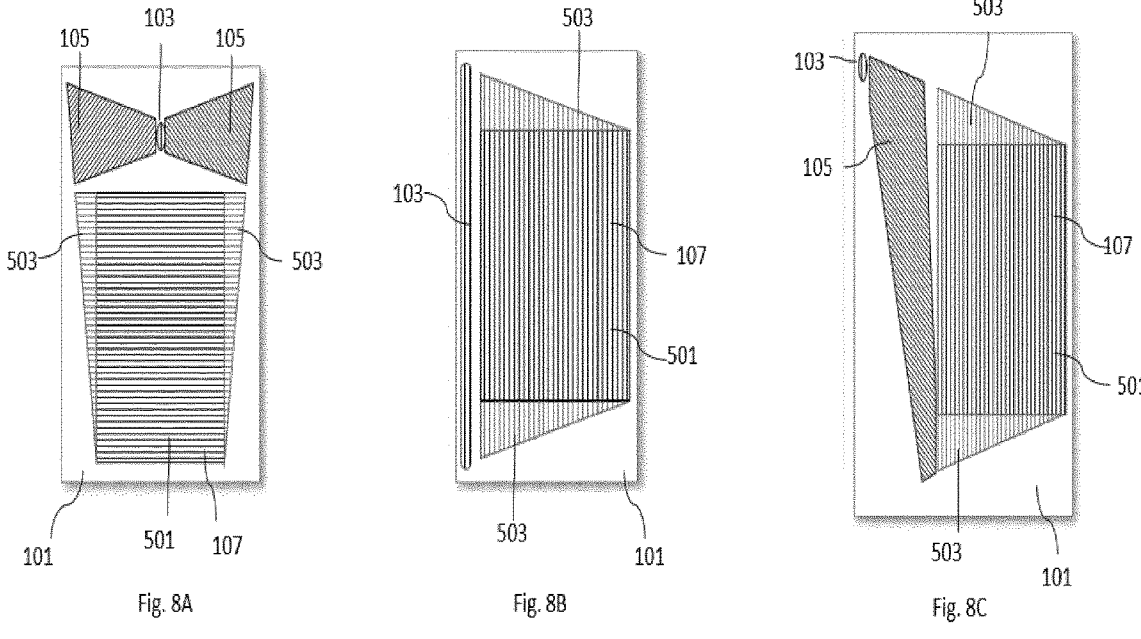
Fig. 8A
Fig. 8B
Fig. 8C

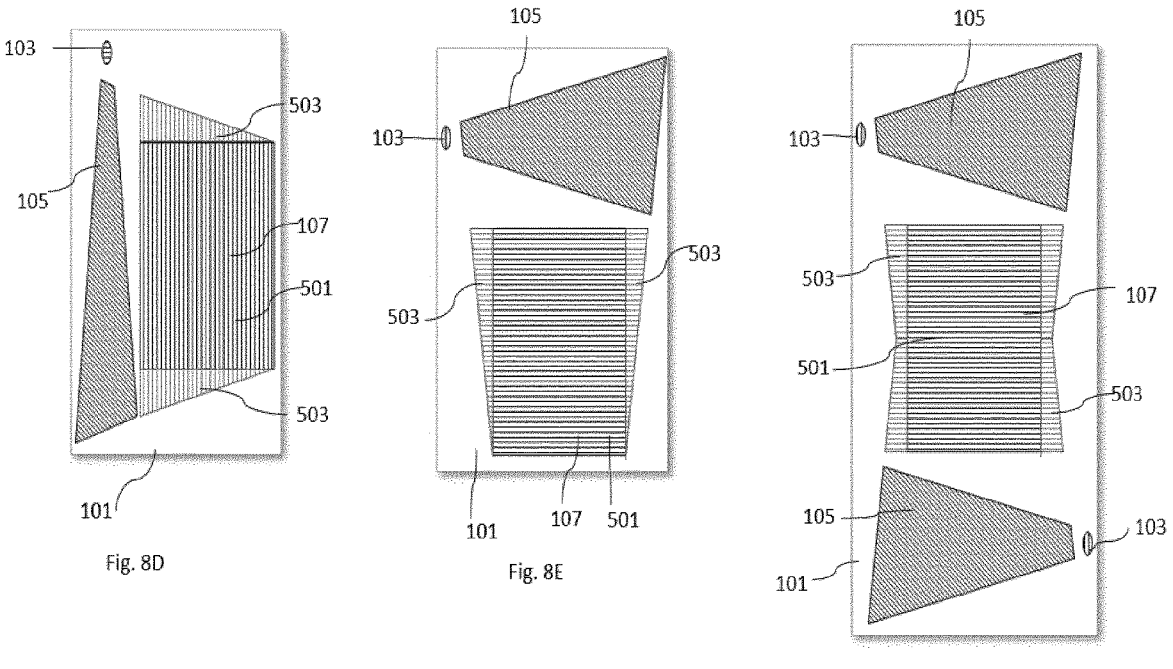
Fig. 8D
Fig. 8E
Fig. 8F
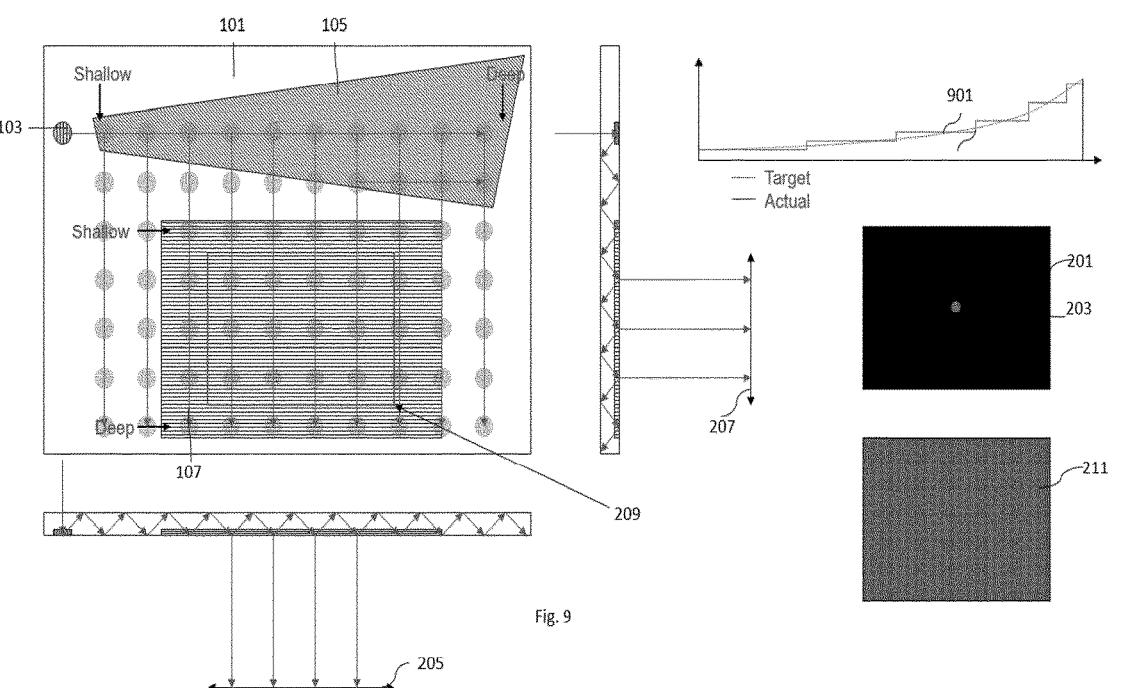
Fig. 9

OPTICAL APPARATUS, MODULES AND DEVICES

CROSS REFERENCE TO RELATED APPLICATION

This patent application is a U.S. National Stage application of International Patent Application Number PCT/EP2021/081190 filed Nov. 10, 2021, which is hereby incorporated by reference in its entirety, and claims priority to EP 20210586.2 filed Nov. 30, 2020.

TECHNOLOGICAL FIELD

Examples of the disclosure relate to optical apparatus, modules and devices. Some relate to optical apparatus, modules and devices for providing a more uniform exit pupil.

BACKGROUND

Optical apparatus, such as exit pupil expanders, can be used in display systems and devices such as near eye displays, augmented and/or virtual reality headsets and head up displays for example.

BRIEF SUMMARY

According to various, but not necessarily all, examples of the disclosure there is provided an apparatus comprising: a light guiding means comprising at least; in-coupling diffractive means configured to in-couple one or more input beams of light into the light guiding means from a light engine, expanding means configured to expand the one or more input beams of light, and out-coupling diffractive means configured to out-couple the one or more expanded beams of light from the light guiding means; wherein the out-coupling diffractive means comprises at least a first section configured to out-couple the one or more expanded beams of light with a first efficiency and at least a second section configured to out-couple the one or more expanded beams of light with a second efficiency, where the second efficiency is lower than the first efficiency.

The second section of the out-coupling diffractive means may be configured to control brightness of a section of an optical output provided by the apparatus.

The first section of the out-coupling diffractive means may comprise a diffractive grating having a first periodicity and the second section of the out-coupling diffractive means comprises one or more sub-sections comprising a diffractive grating having the first periodicity and one or more sub-sections comprising no diffractive grating.

The subsections having no diffractive grating may be positioned in the second section of the out-coupling diffractive means in-between subsections of diffractive gratings.

The periodicity of the subsections within the second section of the outcoupling diffractive means may be configured to reduce phasing within the expanded beam of light.

The second section of the outcoupling diffractive means may comprise absorptive means configured to absorb at least some of the expanded beam of light.

The absorptive means may comprise an absorptive coating.

A second section of the outcoupling diffractive means may be positioned on at least one an edge of the outcoupling diffractive means.

The outcoupling diffractive means may be sized and shaped to align with a size and shape of a preceding diffractive means to enable extreme rays of the expanding means to be outcoupled by the outcoupling diffractive means.

The first section of the out-coupling diffractive means may be positioned at an edge furthest away from a preceding diffractive means and the second section of the out-coupling diffractive means is positioned at an edge closest to the preceding diffractive means.

The second section of the out-coupling diffractive means may be provided across the out-coupling diffractive means so that all of the light incident on the out-coupling diffractive means passes through the second section of the out-coupling diffractive means.

Compared to the first section of the out-coupling diffractive means, the second section of the out-coupling diffractive means may be configured to have at least one of; a different fill factor for a diffractive grating, a different diffractive grating depth, a different grating profile, a different refractive index profile.

The apparatus may comprise a first light guiding means and a second light guiding means; wherein the second light guiding means is provided overlaying the first light guiding means; and wherein the out-coupling diffractive means of the first light guiding means comprises an alternating sequence of diffractive sections and non-diffractive sections and the out-coupling diffractive means of the second light guiding means comprises a corresponding alternating sequence of diffractive sections and non-diffractive sections configured to reduce interference between light out-coupled from the different out-coupling diffractive means.

The out-coupling diffractive means of the second light guiding means may be provided overlaying the out-coupling diffractive means of the second light guiding means and the sequence of the diffractive sections and non-diffractive sections and the out-coupling diffractive means of the second light guiding means is configured so that non-diffractive sections of the out-coupling diffractive means of the second light guiding means overlay diffractive sections of the out-coupling diffractive means of the first light guiding means and diffractive sections of the out-coupling diffractive means of the second light guiding means overlay non-diffractive sections of the out-coupling diffractive means of the first light guiding means.

According to various, but not necessarily all, examples of the disclosure there is provided an apparatus comprising: a light guide comprising at least; in-coupling diffractive elements configured to in-couple one or more input beams of light into the light guide from a light engine, one or more expanders configured to expand the one or more input beams of light, and out-coupling diffractive elements configured to out-couple the one or more expanded beams of light from the light guide; wherein the out-coupling diffractive elements comprise at least a first section configured to out-couple the one or more expanded beams of light with a first efficiency and at least a second section configured to out-couple the one or more expanded beams of light with a second efficiency, where the second efficiency is lower than the first efficiency.

15. A module, a device, a display, a stereoscopic display, an auto stereoscopic display, a head-up display, a display unit of a vehicle and/or a vehicle comprising an apparatus as claimed in any preceding claim.

BRIEF DESCRIPTION

Some examples will now be described with reference to the accompanying drawings in which:

FIG. 7 shows example light guiding means;

FIGS. 8A to 8F show different examples of light guiding means;

FIG. 9 shows example light guiding means;

Figure 1:
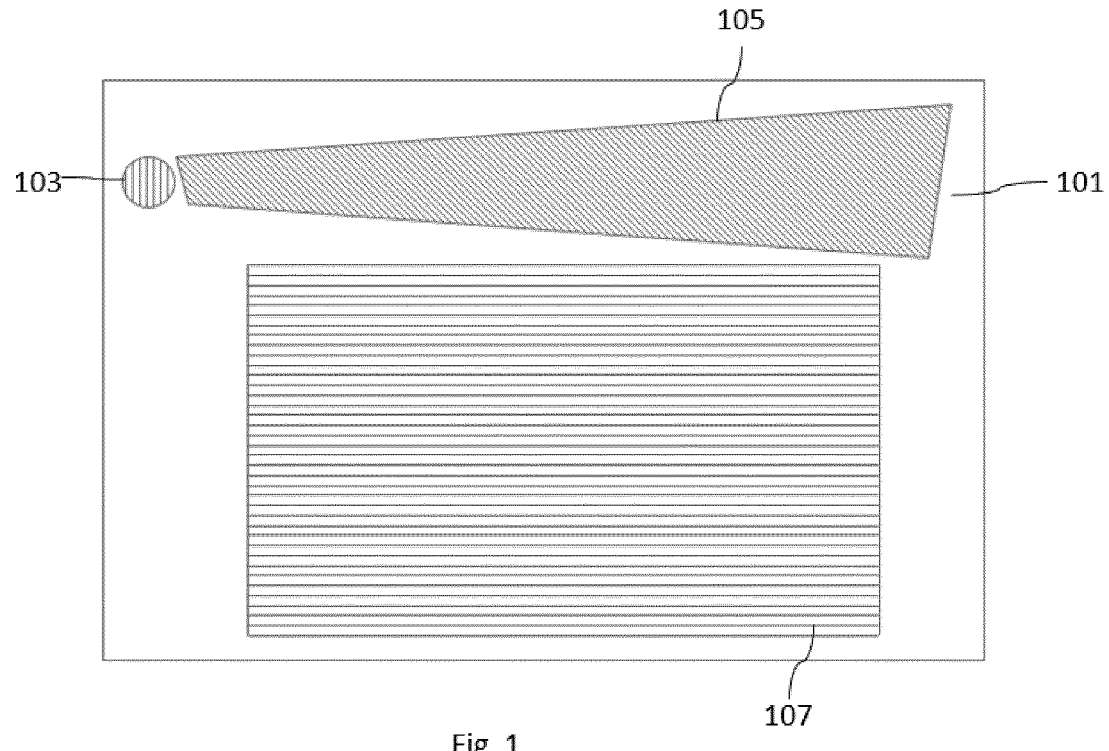
FIG. 1 shows an example light guiding means.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

FIG. 1 shows an example light guiding means 101 that can be used in examples of the disclosure. The light guiding means 101 can be formed on a waveguide, an optical substrate, a transparent plate or any other suitable material.

In this example the light guiding means 101 comprises an exit pupil expander. The exit pupil expander is configured to increase the size of an exit pupil from a light engine or other optical arrangement. The light engine could be a display means such as a light engine, projection engine, or a picture generating unit.

The light guiding means 101 comprises in-coupling diffractive means 103, expanding means 105, and out-coupling diffractive means 107, located on the surfaces or inside the volume of the light guiding means 101.

The in-coupling diffractive means 103 comprise any means that is configured to in-couple one or more beams of light from a light engine into the light guiding means 101.

The in-coupling diffractive means 103 is positioned within the light guiding means 101 so that, in use, the in-coupling diffractive means 103 can be positioned adjacent to the light engine.

The in-coupled beam of light travels inside the light guiding means 101 via total internal reflection. The refractive index of the material that is used for the light guiding means 101, the wavelength of the in-coupled beam, and the parameters of the in-coupling diffractive means 103 determine the total internal reflection angles.

The expanding means 105 is positioned within the light guiding means 101 so that the in-coupled beam of light is provided from the in-coupling diffractive means 103 to the expanding means 105.

The expanding means 105 comprise any means that is configured to expand the in-coupled beam of light in at least one dimension. The expanding means 105 can comprise a diffractive means such as a diffraction grating or any other suitable means. In the diffraction grating the in-coupled beam of light is split into two with every interaction with the diffraction grating. The interaction could be, for example, an internal reflection. The two split sections of the beam travel in different directions and continue splitting and so expand the exit pupil of the light engine. In the example shown in FIG. 1 the expanding means 105 has a grating which expands the beam in a horizontal direction.

The out-coupling diffractive means 107 is positioned within the light guiding means 101 so that the horizontally expanded beam of light is provided from the expanding means 105 to the out-coupling diffractive means 107.

The out-coupling diffractive means 107 comprises any means that is configured to out-couple the horizontally expanded light beam out of the light guiding means. The out-coupling diffractive means 107 can function in a similar manner to the expanding means 105 so that the expanded beam of light is split into two with every interaction with the diffraction grating. The out-coupling diffractive means 107 can also be configured to expand the horizontally expanded beam of light in a second dimension. In the example shown in FIG. 1 the out-coupling diffractive means 107 comprises horizontal grating lines which expand the horizontally expanded beam in the vertical direction.

The light guiding means 101 is configured so that the out-coupled expanded beam of light can be viewed by a user. The out-coupled expanded beams of light provide a virtual image that can be observed by a user. The out-coupled beam of light therefore provides an expanded exit pupil.

It is to be appreciated that the variations in the size, shape, position, and expansion direction of the different diffractive means are examples and that other variations could be used in other examples of the disclosure. For example, the expanding means 105 could expand the light beam in some other direction than horizontal. As another example, the out-coupling diffractive means 107 could expand the beam in some other direction than vertical. As a third example, the exit pupil of the beam of light in-coupled by the in-coupling diffractive means 103 would be expanded in the first expansion dimension already prior to in-coupling the beam into the light guiding means 101. In this example there would be no expanding means 105 positioned within the light guiding means 101. As a fourth example, beams would be in-coupled by the in-coupling means 103 into two different directions inside the light guiding means 101. In this example there could be two separate expanding means 105 and either one shared or two separate out-coupling means 107 provided for these two directions.

The diffractive means that are used for the in-coupling diffractive means 103, expanding means 105, and out-coupling diffractive means 107 can comprise any means that can be configured to diffract the input beams of light. The diffractive means can comprise any one or more of a diffractive optical element, diffractive structure, diffraction gratings, holographic gratings, Bragg gratings, rulings, ridges, surface relief diffractive gratings, volume holograms, or any suitable optical component or feature having a periodic structure that splits and diffracts light into several beams travelling in different directions.

Figure 2:
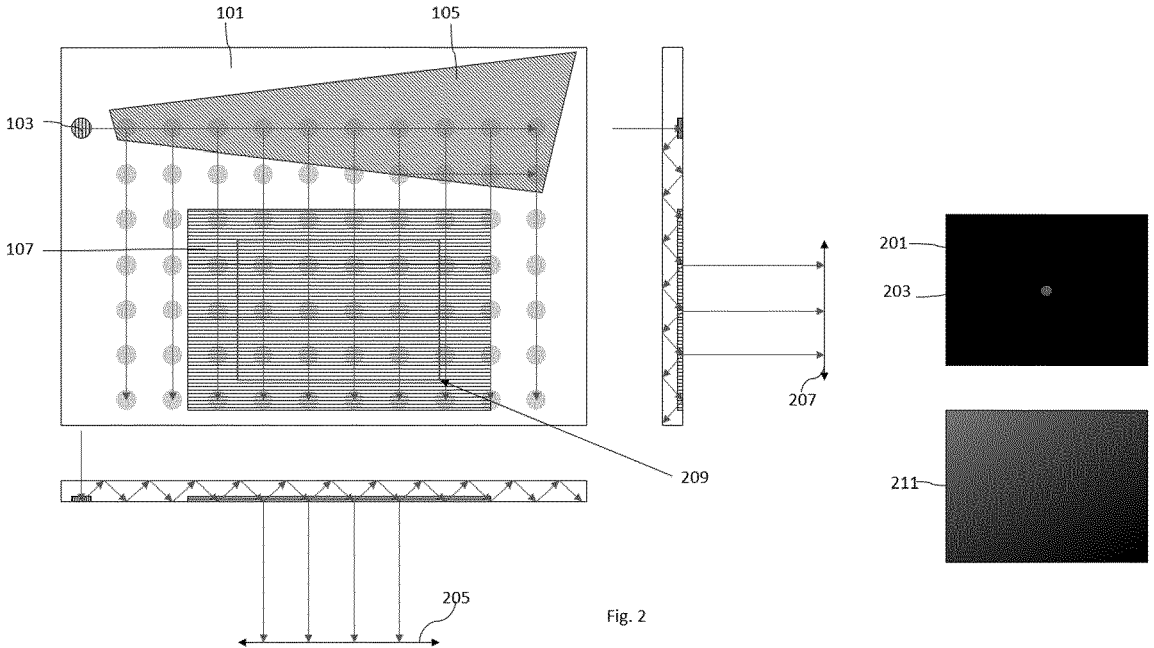
FIG. 2 shows an example light guiding means.

FIG. 2 shows how the light guiding means 101 shown in FIG. 1 can result in uneven brightness within the exit pupil.

In FIG. 2 an image 201 is provided to the in-coupling diffractive means 103. The image 201 in this example comprises a single dot 203 in the centre of the image 201. This corresponds to a beam of light perpendicular to the light guiding means 101, being projected from the light engine.

FIG. 2 shows how the in-coupled beam of light comprising the image 201 is expanded in a horizontal direction by the expanding means 105 and then in a vertical direction by the out-coupling diffractive means 107. This provides an expanded horizontal exit pupil 205 and an expanded vertical exit pupil 207 for the out-coupled beams of light.

An example exit pupil gate 209 that out-couples the beam of light into the exit pupil is shown and a representation of the light energy distribution of the out-coupled beam in the exit pupil 211 that would be provided within this exit pupil gate 209 is shown. The energy distribution of the exit pupil 211 is not uniform. The energy distribution of the exit pupil 211 has dark regions towards the lower right-hand corner of exit the pupil gate 209. This corresponds to the regions of the out-coupling diffractive means 107 that are furthest away from the expanding means 105 and the in-coupling diffractive means 103. Therefore, the beams of light that are out-coupled in this region of the exit pupil gate 209 have travelled further through the light-guiding means 101 and so have a lower intensity. This results in un-even brightness within any images that are provided by these light guiding means 101.

It is to be appreciated that FIG. 2 is a schematic diagram and is not shown to scale. In implementations of the disclosure the in-coupling diffractive means 103 would likely be much larger so that the exit pupils would be larger and have more overlap. This could increase the uniformity of the out-coupled beam. Also, the images in FIG. 2 have been shown for a single wavelength of light. It is to be appreciated that different wavelengths of light would be in-coupled to slightly different angles also partly adding to the increased beam uniformity.

Figure 3:
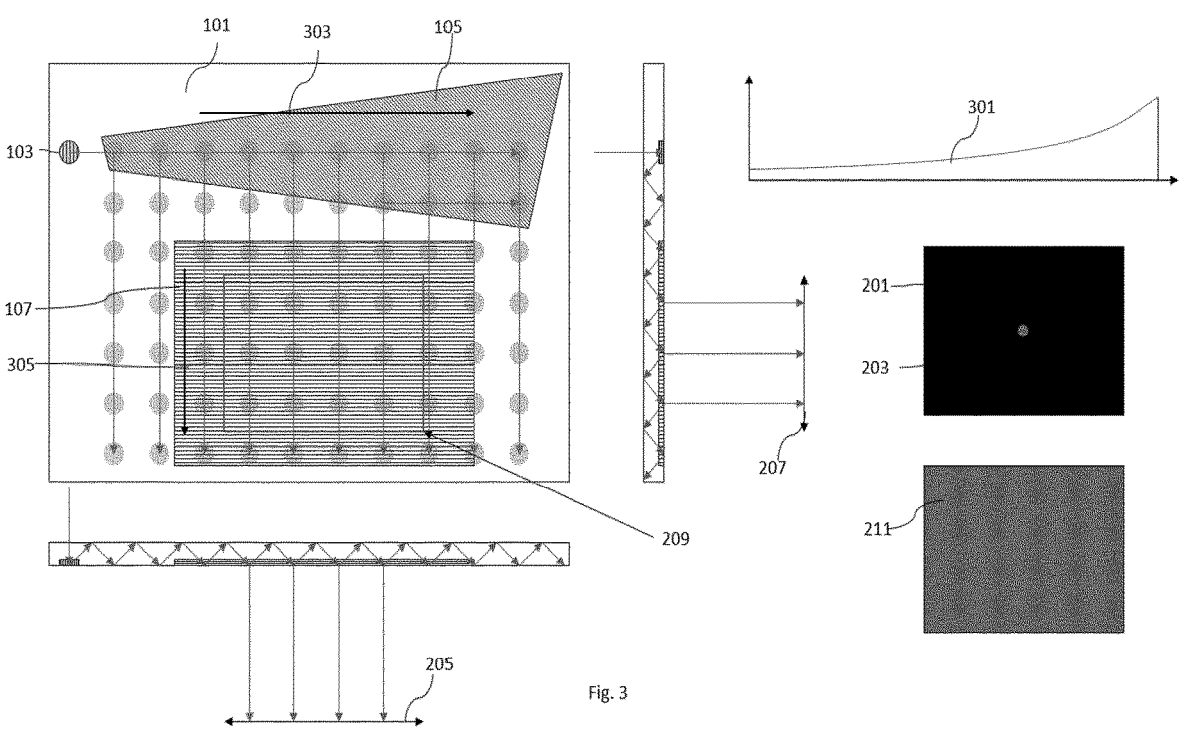
FIG. 3 shows an example light guiding means.

FIG. 3 shows how the uneven brightness within the exit pupil can be, at least partially, corrected by providing different diffractive efficiencies within the light guiding means 101.

In the example shown in FIG. 3 the thickness of the expanding means 105 increases along the horizontal length of the expander means. Plot 301 schematically shows how the thickness of the expanding means 105 gradually increases along the length of the expanding means 105 in the direction indicated by arrow 303. The thickness of the out-coupling diffractive means 107 can also increase along the vertical length of the out-coupling diffractive means 107 in the direction indicated by arrow 305.

The variations in thickness can provide variable diffraction efficiencies within different parts of the light guiding means 101. This can help to reduce unevenness in the brightness of the exit pupil. As shown in FIG. 3 the energy distribution of the exit pupil 211 provided within the exit pupil gate 209 has a more even brightness compared to the energy distribution of the exit pupil 211 provided by the light guiding means 101 shown in FIG. 2.

It is to be appreciated that other means for providing variable diffraction efficiencies can be used in other examples. For instance, a different grating line fill factor, or grating line profile can be used for different parts of the diffractive means within the light guiding means 101. It is also possible to combine multiple different means for providing more subtle variations in diffraction efficiencies. For example, different thickness levels as well as grating line fill factor levels can simultaneously be used in different parts of the diffractive means within the light guiding means 101.

Figure 4:
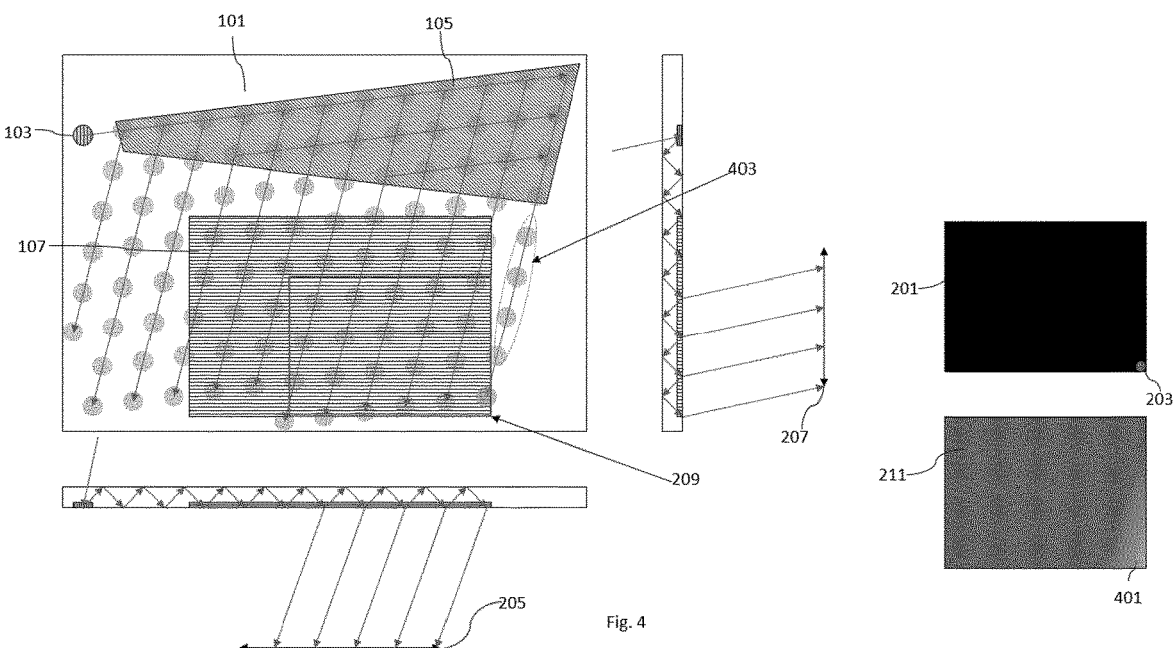
FIG. 4 shows example light guiding means.

FIG. 4 shows another example of how the light guiding means 101 shown in FIG. 1 can result in uneven brightness within images. This shows how the arrangement of the diffractive means within the light guiding means 101 can result in bright corners within the exit pupil.

FIG. 4 shows another example image 201 that can be provided to the in-coupling diffractive means 103. This example image 201 comprises a single dot 203 in the lower right-hand corner of the image 201.

An example exit pupil gate 209 is shown in the lower right hand corner of the out-coupling diffractive means 107. The energy distribution of the exit pupil 211 corresponding to this exit pupil gate 209 is also shown.

This shows a bright region 401 in the lower right-hand corner of the energy distribution of the exit pupil 211. This is caused by the section of the light guiding means 101 indicated within the dashed lines 403. This section is provided between the expanding means 105 and the out-coupling diffractive means 107. This section does not comprise any diffractive grating and so the rays of light that travel through this section do not reduce in intensity as much as the rays of light that travel through the out-coupling diffractive means 107. This therefore causes the bright bottom corner in the energy distribution of the exit pupil 211 of the out-coupled image 201.

Figure 5:
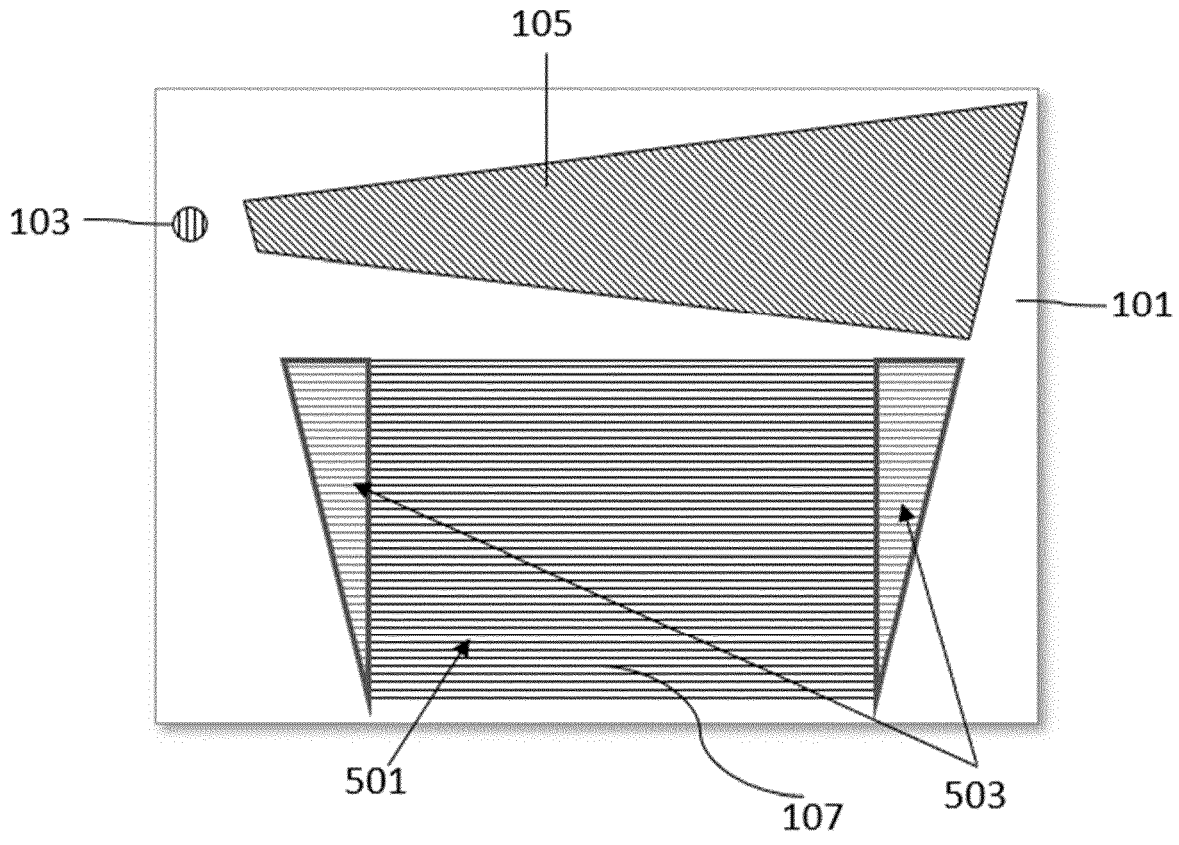
FIG. 5 shows example light guiding means.

FIG. 5 shows a light guiding means 101 according to examples of the disclosure. The light guiding means 101 comprises an in-coupling diffractive means 103, an expanding means 105 and an out-coupling diffractive means 107.

In the example shown in FIG. 5 the out-coupling diffractive means 107 comprises different sections 501, 503 that are configured to out-couple the expanded beams of light with different efficiencies. The different sections 501, 503 are configured to provide a more uniform brightness for exit pupils of the light guiding means 101. In particular the different sections 501, 503 can be configured to address problems with the bright bottom corners of the exit pupils as shown in FIG. 4.

The out-coupling diffractive means 107 comprises a first section 501 which is configured to out-couple the one or more expanded beams of light with a first efficiency. The out-coupling diffractive means 107 also comprises one or more second sections 503 which are configured to out-couple the one or more expanded beams of light with a second efficiency that is different to the first efficiency.

The second efficiency is lower than the first efficiency so that the second sections 503 of the out-coupling diffractive means 107 out-couple the expanded beams of light with a lower efficiency than the first sections 501 of the out-coupling diffractive means 107. In some examples the efficiency with which beams of light are outcoupled can vary across the respective sections 501, 503 so that the out-coupling efficiency varies across the respective areas. The overall efficiency of the coupling from the second section 503 would be lower than the overall efficiency of the first section 501.

The one or more second sections 503 are positioned within the out-coupling diffractive means 107 so as to reduce bright sections from appearing within the exit pupils. The one or more second sections 503 are therefore configured to control the brightness of an optical output provided by an apparatus comprising the light guiding means 101.

The relative positions and arrangements of the different sections 501, 503 within the out-coupling diffractive means 107 can depend on the configuration of the light guiding means 101. For example, it can depend upon the size, shape and relative positions of the respective diffractive means within the light guiding means 101.

The out-coupling diffractive means 107 shown in FIG. 5 has a different size and shape to the out-coupling diffractive means 107 shown in FIGS. 1 to 4. In FIGS. 1 to 4 the out-coupling diffractive means 107 has a rectangular shape while in FIG. 5 the out-coupling diffractive means 107 has a trapezium shape.

In the example of FIG. 5 the out-coupling diffractive means 107 is sized and shaped to align with a size and shape of the preceding diffractive means to enable extreme rays of the preceding diffractive means to be outcoupled by the out-coupling diffractive means 107. In this example the preceding diffractive means is the expanding means 105. In other examples the preceding diffractive means could be an in-coupling diffractive means 103 or other intervening diffractive means could be comprised within the light guiding means 101.

The extreme rays of the preceding diffractive means are the rays of light that are diffracted on the edges of the preceding diffractive means. In the example shown in FIG. 4 the extreme rays comprise the rays that pass through the section indicated by the dotted line 403 that does not comprise any diffractive grating. However, in the example of FIG. 5 the out-coupling diffractive means 107 extends far enough in the horizontal direction that these extreme rays are incident on the out-coupling diffractive means 107.

In examples of the disclosure the outcoupling diffractive means 107 can be sized so that the edge of the out-coupling diffractive means 107 extends at least as far as the edges of the expanding means 105 so that the extreme rays of the expanding means 105 are incident on the out-coupling diffractive means 107. In the example of FIG. 5 the side edges of the out-coupling diffractive means 107 are aligned with the edges of the expanding means 105. Other configurations could be used in other examples of the disclosure.

In the example of FIG. 5 the longer base of the trapezium is positioned closer to the expanding means 105 and the shorter base of the trapezium is positioned further away from the expanding means 105.

In the example of FIG. 5 the trapezium shape of the out-coupling diffractive means 107 is formed from a rectangular first section 501 and two triangular second sections 503. The two triangular second sections 503 are positioned on either side of the rectangular first section 501. The first section 501 of the out-coupling diffractive means 107 has the same size and shape as the standard out-coupling diffractive means 107 shown in FIGS. 1 to 4 and the second sections 503 are provided as additional sections on the side of the first section 501. Other arrangements for the respective sections 501, 503 could be used in other examples of the disclosure. For instance, in other examples a second section 503 might only be provided at one of the side edges of a rectangular first section 501.

Figure 6:
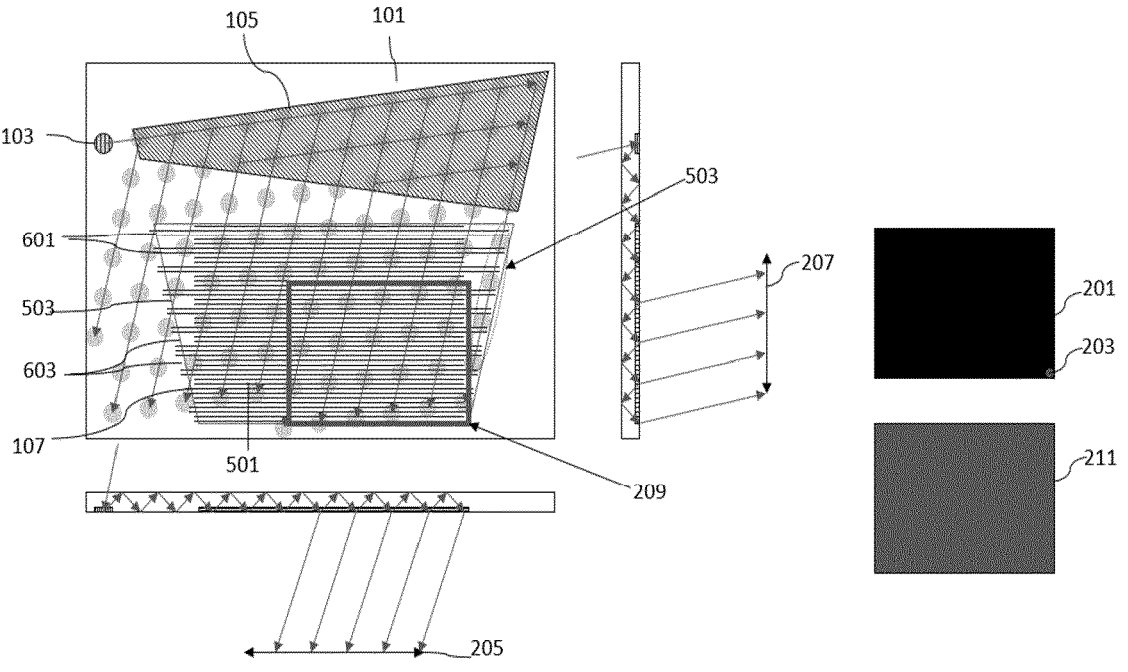
FIG. 6 shows example light guiding means.

The triangular second sections 503 have a lower diffractive efficiency than the first section 501. The different efficiencies of the different sections 501, 503 of the out-coupling diffractive means 107 can be achieved using any suitable means. For instance, the diffractive grating in the second section 503 could have a different fill factor for the diffractive grating, a different diffractive grating depth, a different grating profile, or any other suitable different properties. FIG. 6 shows an example of a light guiding means where the different sections 501, 503 have different configurations for the diffractive gratings.

In other examples the different efficiencies of the different sections 501, 503 of the out-coupling diffractive means 107 can be achieved by using absorptive means to absorb some of the light in the second section 503. FIG. 7 shows an example light guiding means 101 comprising absorptive means.

FIG. 6 shows an example of a light guiding means 101 where the different sections 501, 503 achieve different diffractive efficiencies by having different configurations for the diffractive gratings. In this example the out-coupling diffractive means 107 is provided in a trapezium shape with triangular shaped second sections 503 provided at the edge of a rectangular shaped first section 501 as shown in FIG. 5. Different shapes and configurations for the out-coupling diffractive means 107 and the respective sections of the out-coupling diffractive means 107 could be used in other examples of the disclosure.

The first section 501 of the out-coupling diffractive means 107 comprises a diffractive grating having a first periodicity. The diffractive grating has the same periodicity across all of the first section 501 of the out-coupling diffractive means 107. The diffractive grating is present across all of the first section 501 of the out-coupling diffractive means 107.

The second section 503 of the out-coupling diffractive means comprises a diffractive grating that is not present across all of the area covered by the second section. In the example shown in FIG. 6 the second section 503 comprises sub-sections 601 that comprise a diffractive grating and sub-sections 603 that do not comprise a diffractive grating. The beams of light are not out-coupled in the subsections 603 that do not comprise the diffractive grating. This reduces the amount light out-coupled in the second section 503 sections compared to the light out-coupled by the first section 501.

In the example shown in FIG. 6 each of the sub-sections 601 that comprise a diffractive grating are shown as comprising two slits. It is to be appreciated that this is not shown to scale and that any number of grating lines or grating structures could be provided in each of these sub-sections.

The diffractive grating that is provided in sub-sections 601 of the second section 503 has the same periodicity as the diffractive gratings that is provided in the first section.

The sub-sections 601 with diffractive gratings and sub-sections 603 without diffractive gratings are provided in alternating sub-sections in the second sections 503. The sub-sections 603 having no diffractive grating are positioned in-between sub-sections 601 that comprise diffractive gratings. The periodicity of the subsections 601, 603 within the second section 503 of the out-coupling diffractive means 107 can be selected to support the manufacturing process in order to improve the manufacturing efficiency. For example, the periodicity can be based on the stitched pattern generation size of the electron-beam lithography equipment. The periodicity of the subsections 601, 603 within the second section 503 of the out-coupling diffractive means 107 is configured to reduce phasing within the expanded beam of light. For example, non-repeating patterns are created so that phase diffraction due to the periodicity of the subsections is minimized.

As shown in FIG. 6 the extreme rays from the edges of the expanding means 105 are incident on the second section 503 of the out-coupling diffractive means 107. This controls the brightness of these rays of light so that all of the rays out-coupled within the exit pupil gate 209 have a similar brightness level.

When the image 201 comprising the dot 203 in the lower right-hand corner is provided to the light guiding means 101 the second sections 503 of the out-coupling diffractive means 107 control the brightness of the beams of light that pass through the second sections 503 and out-couple from the exit pupil gate 209 towards the exit pupil. This enables the brightness of these beams after out-coupling to be matched to the brightness of the beams in the rest of the exit pupil. The energy distribution of the exit pupil 211 shown in FIG. 6 has an even distribution and so shows a high level of uniformity.

The diffractive efficiency of the second sections 503 can be controlled by controlling the relative proportions of the areas of the sub-sections 601 comprising diffractive gratings with the areas of the sub-sections 603 that do not comprise diffractive gratings. If the proportion of the sub-sections 601 with diffractive gratings is too high then this would reduce the brightness of the beams of light energy distribution of the exit pupil 211. Conversely if the proportion of the sub-sections 601 with diffractive gratings is too low then this would not reduce the brightness of the beams of light enough. This would result in a brighter area in the lower right-hand corner of the energy distribution of the exit pupil 211.

FIG. 7 shows an example of a light guiding means 101 where the different sections 501, 503 achieve different brightness of the beams of light by using an absorptive means in the second sections 503. In this example the out-coupling diffractive means 107 is provided in a trapezium shape with triangular shaped second sections 503 provided at the edge of a rectangular shaped first section 501 as shown in FIGS. 5 and 6. Different shapes and configurations for the out-coupling diffractive means 107 and the respective sections of the out-coupling diffractive means 107 could be used in other examples of the disclosure.

In this example the absorptive means 701 comprises an absorptive coating. The absorptive coating is provided in the second sections 503 of the out-coupling diffractive means 107. The absorptive coating can be provided as a surface treatment on the second sections 503 of the out-coupling diffractive means 107.

In some examples the absorptive coating can be provided covering all of the second sections 503 of the out-coupling diffractive means 107. In other examples the absorptive coating could be provided on just part of the second sections 503.

As shown in FIG. 7 the extreme rays from the edges of the expanding means 105 are incident on the second section 503 of the out-coupling diffractive means 107. The absorptive means 701 controls the brightness of the beams of light so that the out-coupled beam within the exit pupil gate 209 is uniform, or substantially uniform.

When the image 201 comprising the dot 203 in the lower right-hand corner is provided to the light guiding means 101 the absorptive means 701 in the second sections 503 of the out-coupling diffractive means 107 control the brightness of the beams of light that pass through the section sections 503. This enables the brightness of these beams after out-coupling within the exit pupil gate 209 towards the exit pupil to be matched to the brightness of the beams in the rest of the exit pupil. The energy distribution of the exit pupil 211 shown in FIG. 7 has an even distribution and so shows a high level of uniformity.

The brightness of the beams of light travelling through the second sections 503 can be controlled by controlling the absorptive means 701 used in the second sections. For example, the brightness can be increased by providing a smaller amount of absorptive means 701 or can be decreased by provided a larger amount of absorptive means 701.

FIGS. 8A to 8F show different layout examples of light guiding means 101 comprising different arrangements for the diffractive means and the sections 501, 503 within the out-coupling diffractive means 107. In these examples the second section 503 of the out-coupling diffractive means 107 has a lower diffractive efficiency than the first section 501. The differences in the diffractive efficiencies could be achieved by using different arrangements for the diffractive gratings as shown in FIG. 6, absorptive coatings 701 as shown in FIG. 7 or any other suitable means.

In the example of FIG. 8A the light guiding means 101 comprises two expanding means 105. The in-coupling diffractive means 103 is positioned between the two expanding means 105 so as to provide a symmetrical arrangement.

In the example of FIG. 8A out-coupling diffractive means 107 comprises a trapezium shape. The first section 501 of the out-coupling diffractive means 107 comprises a rectangular section in the centre of the out-coupling diffractive means 107 and the second sections 503 of the out-coupling diffractive means 107 are provided as two triangles at the sides of the rectangular first portion 501.

In the example of FIG. 8B the light guiding means 101 comprises an in-coupling diffractive means 103 and an out-coupling diffractive means 107. In this example the beam of light has been expanded in a first direction before it is provided to the light guiding means 101. In this example the in-coupling diffractive means 103 has an elongate shape and no additional expanding means 105 is provided.

In this example the in-coupling diffractive means 103 is the preceding diffractive element for the out-coupling diffractive means 107.

The out-coupling diffractive means 107 comprises two second sections 503 configured to out-couple the expanded beams of light with a lower level of efficiency compared to the first section 501 of the out-coupling diffractive means 107. In the example of FIG. 8B the second sections 503 comprise triangular portions provided at the side edges of trapezium shaped out-coupling diffractive means 107.

In the example of FIG. 8C the in-coupling diffractive means 103, the expanding means 105 and the out-coupling diffractive means 107 are provided in a sequence that extends along the horizontal direction so that the in-coupling diffractive means 103 is positioned to the left of the expander means 105 and the out-coupling diffractive means 107 is positioned to the right of the expander means 105.

In the example of FIG. 8D the in-coupling diffractive means 103 is provided above the expanding means 105 so that the in-coupling diffractive means 103, expanding means 105 and out-coupling diffractive means 107 are provided in an L-shape.

In the example of FIG. 8E the in-coupling diffractive means 103 and the expander means 105 are provided above the outcoupling diffractive means 107 so that the in-coupling diffractive means 103, expanding means 105 and out-coupling diffractive means 107 are provided in an inverted L-shape.

In each of the examples of 8B to 8E the out-coupling diffractive means 107 comprises two second sections 503 configured to out-couple the expanded beams of light with a lower level of efficiency compared to the first section 501 of the out-coupling diffractive means 107. In each of these examples the second sections 503 comprise triangular portions provided at the side edges of trapezium shaped out-coupling diffractive means 107.

In the example shown in FIG. 8F the light guiding means 101 comprises two in-coupling diffractive means 103, two expanding means 105 and a central out-coupling diffractive means 107. The first in-coupling diffractive means 103 and the first expander means 105 are provided above the shared out-coupling diffractive means 107 so that the first in-coupling diffractive means 103, first expanding means 105 and shared out-coupling diffractive means 107 are provided in an inverted L-shape. The second in-coupling diffractive means 103 and second expanding means 105 are provided below the shared out-coupling diffractive means 107 so that the shared out-coupling diffractive means 107, the expander means 103 and the in-coupling means 103 are provided in an L shape.

The shared out-coupling diffractive means 107 comprises a rectangular first portion 501 provided in the centre of the out-coupling diffractive means 107. The second sections 503 are provided on the sides of the rectangular first portion 501. In this example each second section has a shape formed from two right angled triangles connected at the apex of the triangles. Other shapes of the sections 501, 503 of the out-coupling diffractive means 107 can be used in other examples of the disclosure.

FIG. 9 shows another example the light guiding means 101. In this example the variations in thickness of the expanding means 105 and the out-coupling diffractive means 107 can cause an unevenness in brightness of the exit pupil.

In the example shown in FIG. 9 the thickness of the expanding means 105 increases along the horizontal length of the expanding means 105. The expanding means 105 is shallowest closest to the in-coupling diffractive means 103 and deepest furthest away from the in-coupling diffractive means 103. Plot 901 schematically shows how the thickness of the expanding means 105 increases along the length of the expanding means 105. In this example the thickness of the expanding means 105 increases in step wise increments. This target variation in depth may be intended to be a smooth curve however due to manufacturing tolerances the actual variation in thickness could be provided in the step wise increments.

The thickness of the out-coupling diffractive means 107 can also increase along the vertical length of the out-coupling diffractive means 107. The out-coupling diffractive means 107 is shallowest closest to the expanding means 105 and deepest furthest away from the expanding means 105. The variation in thickness of the out-coupling diffractive means 107 can also increase in stepwise increments.

The stepwise variations in thickness of the expanding means 105 and the out-coupling diffractive means 107 can cause uneven brightness in the exit pupil of the light guiding means 101. In FIG. 9 an image 201 is provided to the in-coupling diffractive means 103. The image 201 in this example comprises a single dot 203 in the centre of the image 201.

An example exit pupil gate 209 is shown and a representation of the energy distribution of the exit pupil 211 that would be provided within this exit pupil gate 209 is shown. The energy distribution of the exit pupil 211 is non-uniform and has a plurality of dark regions corresponding the stepped increases in the depth of the expanding means 105 and the out-coupling diffractive means 107.

Figure 10:
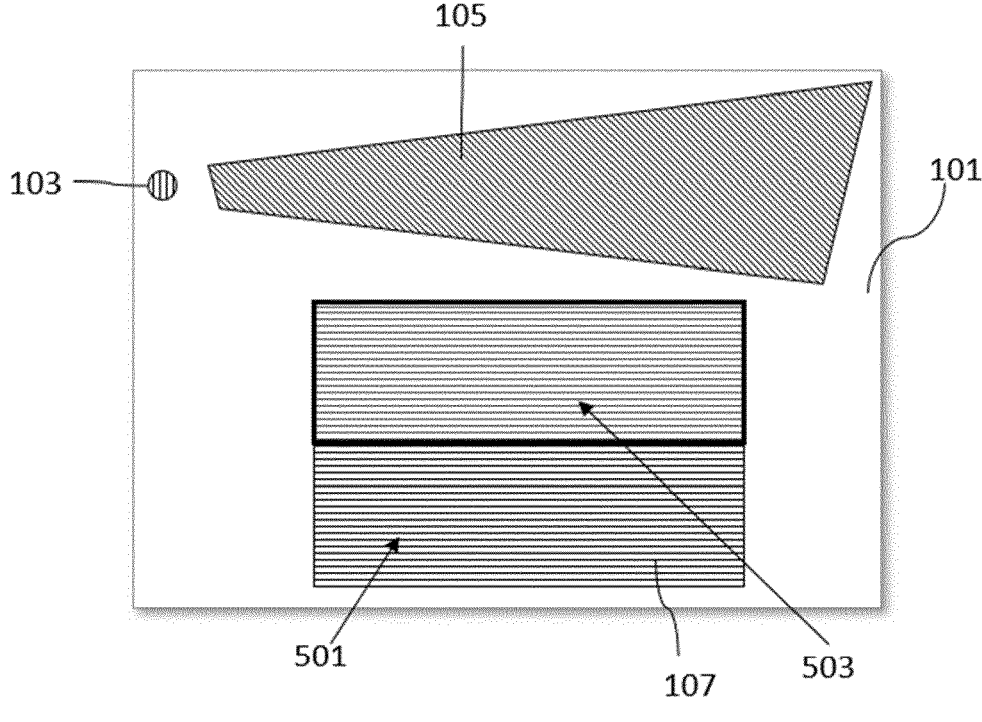
FIG. 10 shows example light guiding means.

FIG. 10 shows another example light guiding means 101 that is configured to correct the unevenness in brightness that is caused by the step-wise variation in thickness of the expanding means 105 and the out-coupling diffractive means 107.

In this example the out-coupling diffractive means 107 comprises a first section 501 and a second section 503 where the second section 503 has a lower diffractive efficiency to account for the variations in thickness of the respective components of the light guiding means 101.

In this example the out-coupling diffractive means 107 has a rectangular shape. The out-coupling diffractive means is positioned so that the length of the rectangle extends parallel to, or substantially parallel to, the length of the expanding means 105.

In this example the first section 501 of the out-coupling diffractive means 107, that has the higher diffractive efficiency, is provided as a rectangular portion. The first section 501 is provided in the region of the out-coupling diffractive means 107 that is furthest away from the expanding means 105. The second section 503 of the out-coupling diffractive means 107, that has the lower diffractive efficiency, is also provided as a rectangular portion. This second section 503 is provided in the region of the out-coupling diffractive means 107 that is closest to the expanding means 105.

In the example shown in FIG. 10 the second section 503 of the out-coupling diffractive means 107 is provided across the out-coupling diffractive means 107 so that all of the light incident on the out-coupling diffractive means 107 passes through the second section 503 of the out-coupling diffractive means 107. The second section 503 extends along length of the out-coupling diffractive means 107. The second section 503 can extend along all of the length of the out-coupling diffractive means 107.

Figure 11:
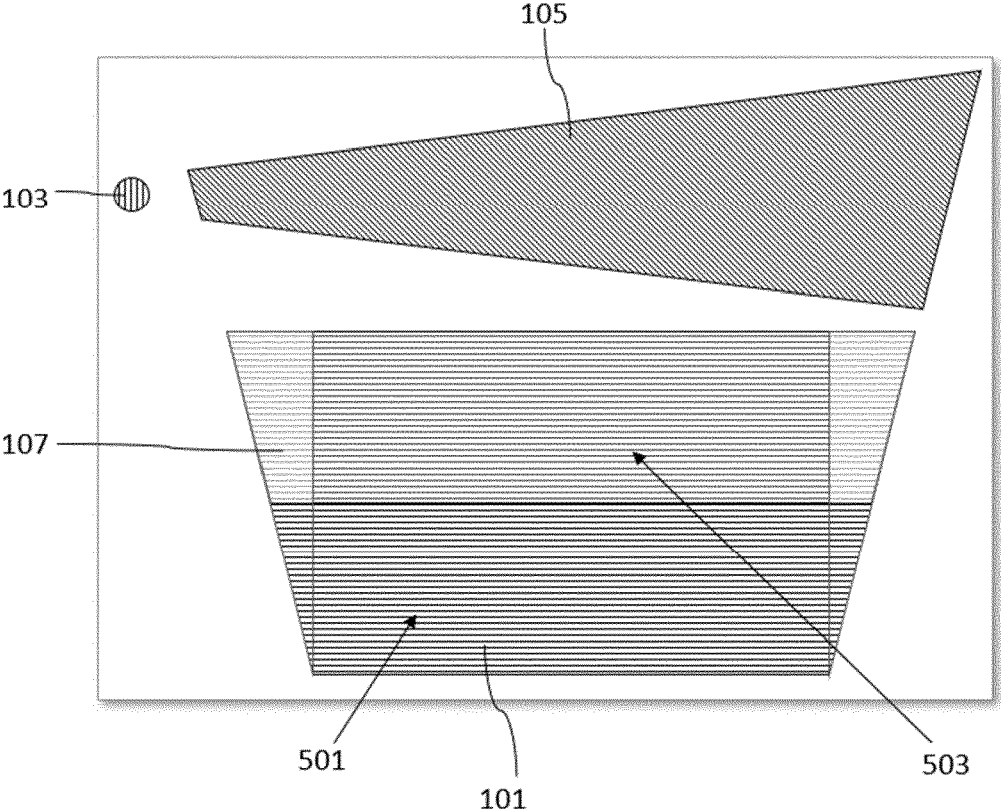
FIG. 11 shows example light guiding means.

FIG. 11 shows another example light guiding means 101 that is configured to correct the unevenness in brightness that is caused by the step-wise variation in thickness of the expanding means 105 and the out-coupling diffractive means 107.

In this example the out-coupling diffractive means 107 also comprises a first section 501 and a second section 503 where the second section 503 has a lower diffractive efficiency to account for the variations in thickness of the respective components of the light guiding means 101.

In this example the out-coupling diffractive means 107 has a trapezium shape. The out-coupling diffractive means is positioned so that the bases of the trapezium extend parallel to, or substantially parallel to, the length of the expanding means 105.

In this example the first section 501 of the out-coupling diffractive means 107, that has the higher diffractive efficiency, is provided as a trapezium shaped portion. The first section 501 is provided in the region of the out-coupling diffractive means 107 that is furthest away from the expanding means 105. The second section 503 of the out-coupling diffractive means 107, that has the lower diffractive efficiency, is also provided as a trapezium shaped portion. This second section 503 is provided in the region of the out-coupling diffractive means 107 that is closest to the expanding means 105.

The out-coupling diffractive means 107 are sized so that the edge of the out-coupling diffractive means 107 extends at least as far as the edges of the expanding means 105. This enables extreme rays of the expanding means 105 to be incident on the out-coupling diffractive means 107. In the example of FIG. 11 the side edges of the out-coupling diffractive means 107 are aligned with the edges of the expanding means 105. Other configurations could be used in other examples of the disclosure.

In the example shown in FIG. 11 the second section 503 of the out-coupling diffractive means 107 is provided across the out-coupling diffractive means 107 so that all of the light incident on the out-coupling diffractive means 107 passes through the second section 503 of the out-coupling diffractive means 107. The second section 503 extends along the length of the out-coupling diffractive means 107. The second section 503 can extend along all of the length of the out-coupling diffractive means 107.

Figure 12:
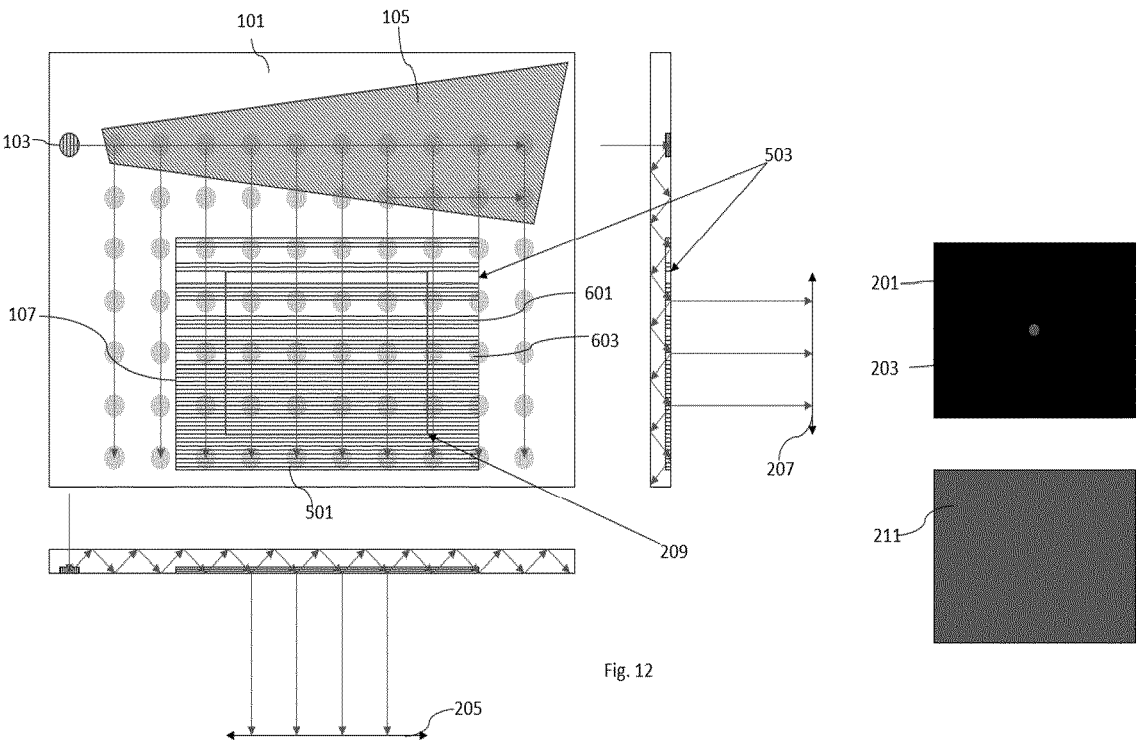
FIG. 12 shows example light guiding means.
Figure 13:
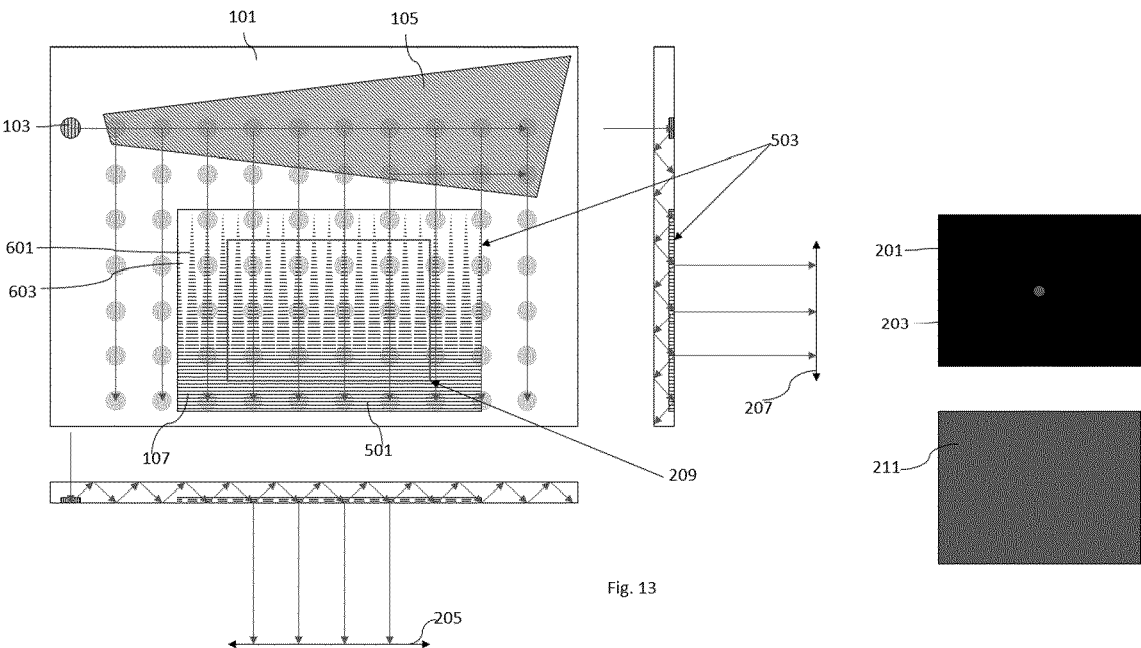
FIG. 13 shows example light guiding means.

The different diffractive efficiencies of the second sections 503 shown in FIGS. 10 and 11 can be achieved using any suitable means. In some examples the different diffractive efficiencies can be achieved by providing a different fill factor for a diffractive grating, a different diffractive grating depth, a different grating profile, a different refractive index profile or any other suitable variations of the diffractive gratings. Using a plurality of different means together to control the diffraction efficiency can be used to achieve a uniform exit pupil. In some cases not all of these means are available due to for example manufacturing limitations. FIGS. 12 and 13 show examples of different configurations for the diffractive grating within the second section 503 of the out-coupling diffractive means 107. These configurations are examples how the diffraction efficiency could be controlled to achieve better uniformity for the exit pupil. These examples could also be combined with other means of controlling the diffraction efficiencies.

FIG. 12 shows another example light guiding means 101. In the example shown in FIG. 12 the out-coupling diffractive means 107 has a rectangular shape. The out-coupling diffractive means is positioned so that the length of the rectangle extends parallel to, or substantially parallel to, the length of the expanding means 105.

In this example the first section 501 of the out-coupling diffractive means 107, that has the higher diffractive efficiency, is provided as a rectangular portion and the second section 503 of the out-coupling diffractive means 107, that has the lower diffraction efficiency, is also provided as a rectangular portion in a similar arrangement to that shown in FIG. 10.

In the example shown in FIG. 12 second section 503 of the out-coupling diffractive means 107 comprises a diffractive grating that is not uniform across all of the area covered by the second section 503. In the example shown in FIG. 12 the second section 503 comprises sub-sections 601 that comprise a diffractive grating and sub-sections 603 that do not comprise a diffractive grating. The sizes and the positions of the respective sub-sections 601, 603 are positioned so as the control the brightness of the beams of light to provide even brightness levels across the exit pupil.

The diffractive grating that is provided in sub-sections 601 of the second section 503 has the same periodicity as the diffractive gratings that is provided in the first section 501. The diffraction grating can be uniform across all of the first section 501.

The sub-sections 601 with diffractive gratings and sub-sections 603 without diffractive gratings are provided in alternating sub-sections in the second section 503. The sub-sections 603 having no diffractive grating are positioned in-between subsections 601 that comprise diffractive gratings. The periodicity of the subsections 601, 603 within the second section 503 of the out-coupling diffractive means 107 is configured to reduce phasing within the expanded beam of light.

In the example shown in FIG. 12 the sub-sections 601, 603 extend across the whole of the length of the rectangle that forms the out-coupling diffractive means 107. The sub-sections 601, 603 therefore comprise elongate rectangular shapes that extend along the length of the out-coupling diffractive means 107. In this example the sub-sections 601 that comprise diffractive grating portions extend along the whole length of the out-coupling diffractive means 107 and the sub-sections 603 that do not comprise any diffractive gratings also extend along whole length of the out-coupling diffractive means 107.

In the example shown in FIG. 12 the sub-sections 601 that comprise a diffractive grating are shown as comprising two or three slits. It is to be appreciated that this is not shown to scale and that any number of diffractive grating lines or diffractive structures could be provided in each of these sub-sections 601. It is to be appreciated that different numbers of diffractive grating lines or diffractive structures could be provided in the different sub-sections 601.

When the image 201 comprising the dot 203 in the centre is provided to the light guiding means 101 the second sections 503 of the out-coupling diffractive means 107 control the brightness of the beams of light that pass through the section sections 503. This enables the brightness of these beams after out-coupling to be matched to the brightness of the beams in the rest of the exit pupil. The energy distribution of the exit pupil 211 shown in FIG. 12 is has an even distribution and so shows a high level of uniformity.

FIG. 13 shows another example light guiding means 101 that is configured to correct for variations in brightness caused by the different thicknesses of the components of the light guiding means 101. In the example shown in FIG. 13 the out-coupling diffractive means 107 has a rectangular shape. The out-coupling diffractive means is positioned so that the length of the rectangle extends parallel to, or substantially parallel to, the length of the expanding means 105.

In this example the first section 501 of the out-coupling diffractive means 107, that has the higher diffractive efficiency, is provided as a rectangular portion and the second section 503 of the out-coupling diffractive means 107, that has the lower diffractive efficiency, is also provided as a rectangular portion in a similar arrangement to that shown in FIG. 10.

In the example shown in FIG. 13 second section 503 of the out-coupling diffractive means 107 comprises a diffractive grating that is not uniform across all of the area covered by the second section 503. In the example shown in FIG. 13 the second section 503 comprises sub-sections 601 that comprise a diffractive grating and sub-sections 603 that do not comprise a diffractive grating. The sizes and the positions of the respective sub-sections 601, 603 are positioned so as the control the brightness of the rays of light to provide even brightness levels across the exit pupil.

The diffractive grating that is provided in sub-sections 601 of the second section 503 has the same periodicity as the diffractive gratings that is provided in the first section 501.

In the example of FIG. 13 the sub-sections 601 that comprise diffractive gratings and the sub-sections 603 that do not comprise diffractive gratings are provided in an alternating arrangement along the length of the out-coupling diffractive means 107. The sub-sections 601 that comprise diffractive gratings and the sub-sections 603 that do not comprise diffractive gratings are provided in an interdigitated arrangement along the length of the out-coupling diffractive means 107. The sub-sections 601 that comprise diffractive gratings have a tapered shape where the narrowest end of the shape is closest to the expanding means 105 and the widest end is adjacent to the first section of the out-coupling diffractive means 107. The sub-sections 603 that do not comprise diffractive gratings have a tapered shape which is inverted compared to that of sub-sections 601 that comprise diffractive gratings. The narrowest end of the sub-sections 603 that do not comprise diffractive gratings is therefore provided at the end adjacent to the first section 501 of the out-coupling diffractive means 107 and the widest end is provided closest to the expanding means 105.

When the image 201 comprising the dot 203 in the centre is provided to the light guiding means 101 the second sections 503 of the out-coupling diffractive means 107 control the brightness of the beams of light that pass through the section sections 503. This enables the brightness of these beams after out-coupling to be matched to the brightness of the beams in the rest of the exit pupil. The energy distribution of the exit pupil 211 shown in FIG. 13 has an even distribution and so shows a high level of uniformity.

Figure 14:
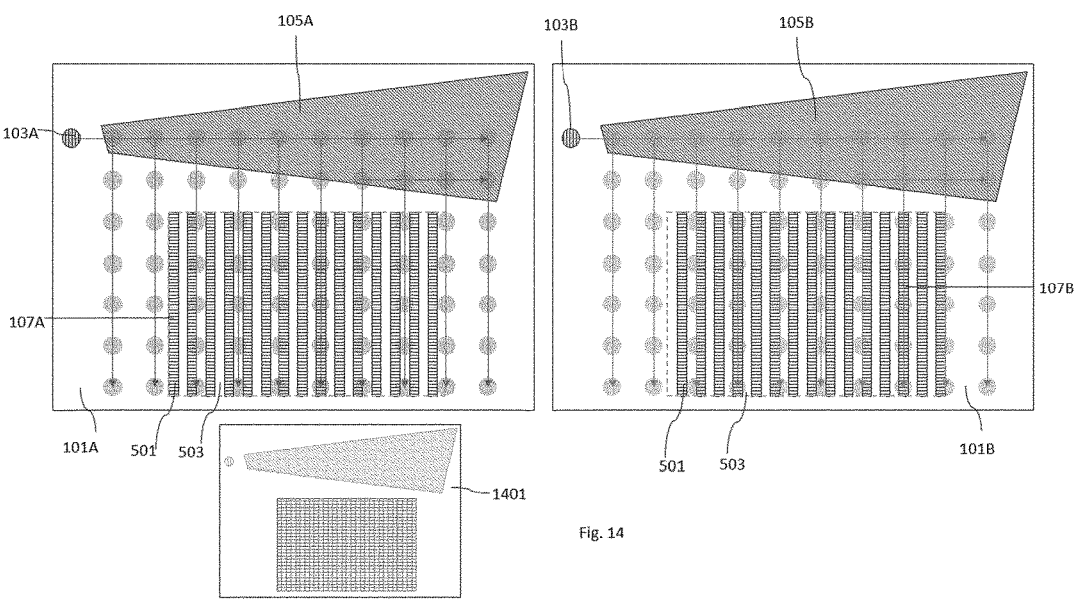
FIG. 14 shows example light guiding means.

FIG. 14 shows an example apparatus 1401 comprising a first light guiding means 101A and a second light guiding means 101B. In the apparatus 1401 the second light guiding means 101B is provided overlaying the first light guiding means 101A. FIG. 14 also shows the first light guiding means 101A and second light guiding means 101B separately so as to illustrate the components of the respective light guiding means 101A, 101B.

Each of the first light guiding means 101A and second light guiding means 101B comprises an in-coupling diffractive means 103A, 103B, an expanding means 105A, 105B and an out-coupling diffractive means 107A, 107B.

In the example shown in FIG. 14 the in-coupling diffractive means 103A, 103B, expanding means 105A, 105B and out-coupling diffractive means 107A, 107B have the same sizes and shapes in each of the different light guiding means 101A, 101B so that when the second light guiding means 101B is provided overlaying the first light guiding mean 101A the respective components of the different light guiding means 101A, 101B are aligned with each other.

The out-coupling diffractive means 107A, 107B are configured to reduce interference between the light out-coupled from the different light guiding means 101A, 101B when they are stacked over each other. In the example of FIG. 14 the out-coupling diffractive means 107A of the first light guiding means 101A comprises an alternating sequence of first section 501 and second sections 503. The first sections 501 can be diffractive sections and the second sections 503 can be non-diffractive sections so as to reduce the interference of the out-coupled light from the different light guiding means 101A, 101B.

In the example shown in FIG. 14 the first sections 501 and second sections 503 form elongate sections 501, 503 that extend away from the expanding means 105. Other configurations could be used in other examples.

The sequence of the first sections 501 and second sections 503 of the out-coupling diffractive means 107B of the second light guiding means 101B is configured so that, when the second light guiding means 101B is provided overlaying the first light guiding means 101A the first sections 501 of the second light guiding means 101B overlay the second sections 503 of the first light guiding means 101A. Similarly, the second sections 503 of the second light guiding means 101B overlay the first sections 501 of the first light guiding means 101A.

The alternating sequences of first section 501 and second sections 503 extends across all of the area of the out-coupling diffractive means 107A, 107B. The first sections 501 and the second sections 503 are configured so that approximately half of the out-coupling diffractive means 107A, 107B comprises diffractive sections and approximately half of the out-coupling diffractive means 107A, 107B comprises non-diffractive sections.

In the example shown in FIG. 14 the first sections 501 have a similar width to the second sections 503. Other configurations of the respective sections 501, 503 could be used in other examples of the disclosure.

Figure 15:
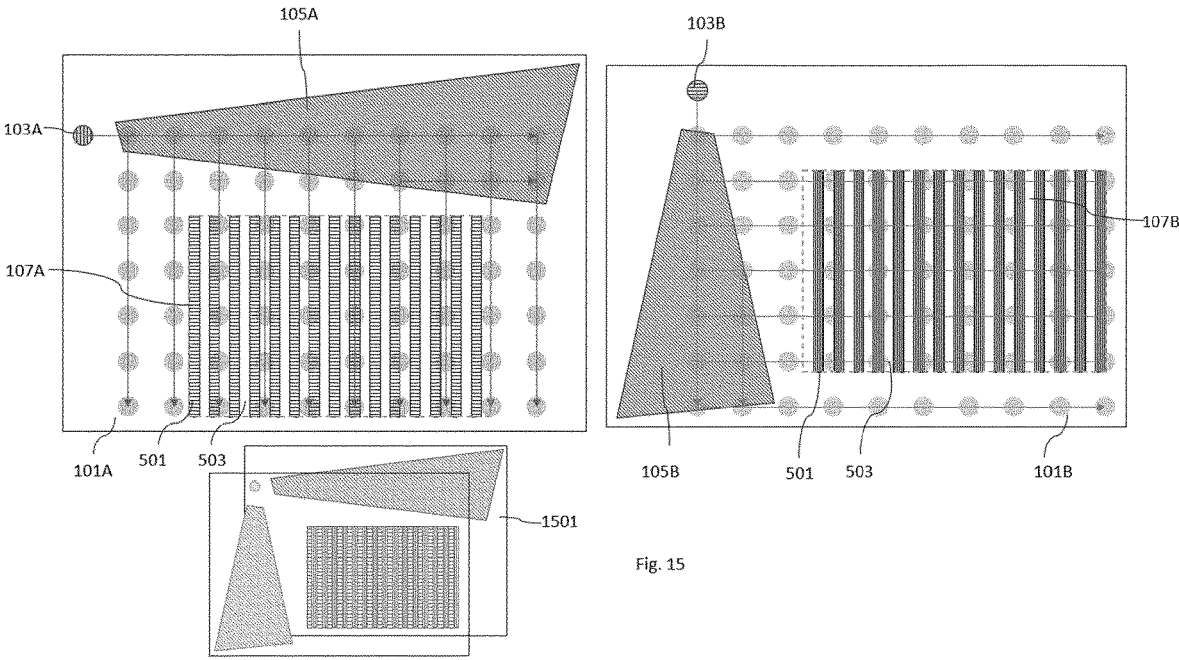
FIG. 15 shows example light guiding means.

In the example shown in FIG. 14 the second light guiding means 101B has the same configuration as the first light guiding means 101A so that when they are in the stacked configuration each of the components of the second light guiding means 101B overlay corresponding components of the first light guiding means 101A. FIG. 15 shows another example in which the second light guiding means 101B has a different configuration to the first light guiding means 101A.

In the example of FIG. 15 the second light guiding means 101B is configured so that the expanding means 105B is provided underneath the in-coupling diffractive means 103B rather than to the side of the in-coupling diffractive means. When the second light guiding means 101B is positioned overlaying the first light guiding means 101A the respective expanding means 105A, 105B are not overlapping however the respective in-coupling diffractive means 103A, 103B would still be overlaying each other, and the out-coupling diffractive means 107A, 107B would still be overlaying each other.

The first sections 501 and second sections 503 of the first out-coupling diffractive means 107A form elongate sections 501, 503 that extend away from the expanding means 105 similar to the examples shown in FIG. 14. However, in FIG. 15 the first sections 501 and second sections 503 of the second out-coupling diffractive means 107B form elongate sections 501, 503 that extend parallel to the expanding means 105B. This ensures that when the second light guiding means 101B is provided in an apparatus 1501 overlaying the first light guiding means 101A the first sections 501 of the second light guiding means 101B overlay the second sections 503 of the first light guiding means 101A. Similarly, the second sections 503 of the second light guiding means 101B overlay the first sections 501 of the first light guiding means 101A.

In the examples shown in FIGS. 14 and 15 the respective out-coupling diffractive means 107A, 107B are configured so that they are completely overlapping each other. In some examples there might be only a partial overlap between the respective out-coupling diffractive means 107A, 107B.

Figure 16:
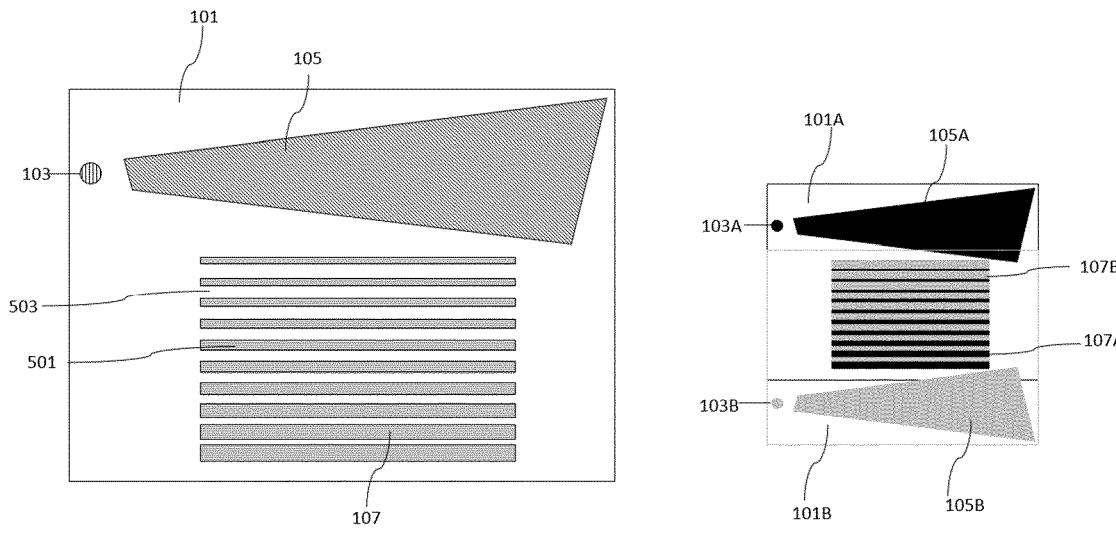
FIG. 16 shows example light guiding means.

FIG. 16 shows another example apparatus 1401 comprising a first light guiding means 101A and a second light guiding means 101B. FIG. 16 shows an example light guiding means 101 comprising an in-coupling diffractive means 103 an expanding means 105 and an out-coupling diffractive means 107. Two of these light guiding means 101A, 101B can be stacked to form an apparatus 1401 as shown in FIG. 16.

In this example the out-coupling diffractive means 107 is also configured to reduce interference between the light out-coupled from the different light guiding means when they are stacked over each other to form an apparatus 1401. In the example of FIG. 16 the out-coupling diffractive means 107 also comprises an alternating sequence of first section 501 and second sections 503 in which the first sections 501 can be diffractive sections and the second sections 503 can be non-diffractive sections.

In the example shown in FIG. 16 the first sections 501 and second sections 503 form elongate sections 501, 503 that extend away from the expanding means 105. In the example of FIG. 16 the first sections 501 increase in size across the out-coupling diffractive means 107. In the example of FIG. 16 the first sections 501 closest to the expanding means 105 are smaller than the first sections 501 that are further away from the expanding means 105. In the example of FIG. 16 the second sections 503 decrease in size across the out-coupling diffractive means 107. In the example of FIG. 16 the second sections 503 closest to the expanding means 105 are larger than the second sections 503 that are further away from the expanding means 105.

When the first light guiding means 101A is stacked with the second light guiding means 101B the second light guiding means 101B is configured in mirror image of the first light guiding means 101A as though the first light guiding means 101A has been reflected about a horizontal axis.

The size and spacings of the first sections 501 and second sections 503 of the out-coupling diffractive means 107B of the second light guiding means 101B is configured so that, when the second light guiding means 101B is provided overlaying the first light guiding means 101A the first sections 501 of the second light guiding means 101B overlay the second sections 503 of the first light guiding means 101A. Similarly, the second sections 503 of the second light guiding means 101B overlay the first sections 501 of the first light guiding means 101A.

Examples of the disclosure therefore provide various light guiding means that can be configured to provide more even brightness in an exit pupil and so can provide improved image quality.

Apparatus comprising light guiding means 101 as described above can be comprised within a module, a device, a display, a stereoscopic display, an auto stereo-scopic display, a head-up display, a display unit of a vehicle and/or a vehicle or any other suitable entity.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particu-lar instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equiva-lent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:
   a light guide comprising at least an in-coupling diffractive member configured to in-couple one or more input beams of light into the light guide from a light engine, an expander configured to expand the one or more input beams of light, and an out-coupling diffractive member configured to out-couple the one or more expanded beams of light from the light guide;
   wherein the out-coupling diffractive member comprises at least a first section configured to out-couple the one or more expanded beams of light with a first efficiency and at least a second section configured to out-couple the one or more expanded beams of light with a second efficiency, where the second efficiency is lower than the first efficiency;
   wherein the second section of the outcoupling diffractive member comprises an absorptive member configured to absorb at least some of the expanded beam of light; and
   wherein an amount of the absorptive member is increased or decreased to control a brightness of the one or more beams of light in the light guide.

2. An apparatus as claimed in claim 1 wherein the second section of the out-coupling diffractive member is configured to control brightness of a section of an optical output provided with the apparatus.

3. An apparatus as claimed in claim 1 wherein the first section of the out-coupling diffractive member comprises a diffractive grating having a first periodicity and the second section of the out-coupling diffractive member comprises one or more sub-sections comprising a diffractive grating having the first periodicity and one or more sub-sections comprising no diffractive grating.

4. An apparatus as claimed in claim 3 wherein the subsections having no diffractive grating are positioned in the second section of the out-coupling diffractive member in-between subsections of diffractive gratings.

5. An apparatus as claimed in claim 3 wherein the periodicity of the subsections within the second section of the outcoupling diffractive member is configured to reduce phasing within the expanded beam of light.

6. An apparatus as claimed in claim 1 wherein the absorptive member comprises an absorptive coating.

7. An apparatus as claimed in claim 1 wherein a second section of the outcoupling diffractive member is positioned on at least one edge of the outcoupling diffractive member.

8. An apparatus as claimed in claim 1 wherein the outcoupling diffractive member is sized and shaped to align with a size and shape of a preceding diffractive member to enable extreme rays of the expander to be outcoupled with the outcoupling diffractive member.

9. An apparatus as claimed in claim 1 wherein the first section of the out-coupling diffractive member is positioned at an edge furthest away from a preceding diffractive member and the second section of the out-coupling diffractive member is positioned at an edge closest to the preceding diffractive member.

10. An apparatus as claimed in claim 1 wherein the second section of the out-coupling diffractive member is provided across the out-coupling diffractive member so that light incident on the out-coupling diffractive member passes through the second section of the out-coupling diffractive member.

11. An apparatus as claimed in claim 1 wherein, compared to the first section of the out-coupling diffractive member, the second section of the out-coupling diffractive member is configured to have at least one of a different fill factor for a diffractive grating, a different diffractive grating depth, a different grating profile, or a different refractive index profile.

12. An apparatus as claimed in claim 1 wherein the apparatus comprises a first light guide and a second light guide;
   wherein the second light guide is provided overlaying the first light guide; and
   wherein the out-coupling diffractive member of the first light guide comprises an alternating sequence of diffractive sections and non-diffractive sections and the out-coupling diffractive member of the second light guide comprises a corresponding alternating sequence of diffractive sections and non-diffractive sections configured to reduce interference between light outcoupled from the different out-coupling diffractive members.

13. An apparatus as claimed in claim 12 wherein the out-coupling diffractive member of the second light guide is provided overlaying the out-coupling diffractive member of the second light guide and the sequence of the diffractive sections and non-diffractive sections and the out-coupling diffractive member of the second light guide is configured so that non-diffractive sections of the out-coupling diffractive member of the second light guide overlays diffractive sections of the out-coupling diffractive member of the first light guide and diffractive sections of the out-coupling diffractive member of the second light guide overlays non-diffractive sections of the out-coupling diffractive member of the first light guide.

14. A module, a device, a display, a stereoscopic display, an auto stereoscopic display, a heads-up display, a display unit of a vehicle, or a vehicle comprising an apparatus as claimed in claim 1.

* * * * *